(12) United States Patent
Miyamoto et al.

(10) Patent No.: US 8,311,832 B2
(45) Date of Patent: Nov. 13, 2012

(54) HYBRID-CAPTIONING SYSTEM

(75) Inventors: Kohtaroh Miyamoto, Tokyo-to (JP);
Noriko Negishi, Tokyo-to (JP); Kenichi Arakawa, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 12/172,260

(22) Filed: Jul. 13, 2008

(65) Prior Publication Data

US 2008/0270134 A1 Oct. 30, 2008

Related U.S. Application Data

(63) Continuation of application No. 11/294,234, filed on Dec. 4, 2005.

(51) Int. Cl.
*G10L 21/00* (2006.01)
*G10L 17/00* (2006.01)
*G10L 15/04* (2006.01)
*H04N 11/00* (2006.01)
*H04N 7/00* (2006.01)

(52) U.S. Cl. ........ 704/270; 704/246; 704/251; 348/468; 348/461; 348/462; 348/473; 348/465

(58) Field of Classification Search .................. 704/270, 704/246, 251
See application file for complete search history.

(56) References Cited

U.S. PATENT DOCUMENTS

| | | | | |
|---|---|---|---|---|
| 5,729,741 | A * | 3/1998 | Liaguno et al. ........................ | 1/1 |
| 5,982,448 | A * | 11/1999 | Reyes ............................ | 348/552 |
| 6,453,294 | B1 * | 9/2002 | Dutta et al. ................ | 704/270.1 |
| 6,505,153 | B1 * | 1/2003 | Van Thong et al. ........... | 704/211 |
| 6,571,210 | B2 * | 5/2003 | Hon et al. ...................... | 704/251 |

(Continued)

FOREIGN PATENT DOCUMENTS

JP 2004302175 A 10/2004

OTHER PUBLICATIONS

Piperidis S., Demiros I., Prokopidis P., Vanroose P., Hoethker A., Daelemans W., Sklavounou E., Konstantinou M. and Karavidas Y. (2004). Multimodal Multilingual Resources in the Subtitling Process, in the Proceedings of the 4th International Language Resources and Evaluation Conference (LREC 2004), Lisbon.*

(Continued)

*Primary Examiner* — Richemond Dorvil
*Assistant Examiner* — Michael Ortiz Sanchez
(74) *Attorney, Agent, or Firm* — Vazken Alexanian

(57) ABSTRACT

A hybrid-captioning system for editing captions for spoken utterances within video includes an editor-type caption-editing subsystem, a line-based caption-editing subsystem, and a mechanism. The editor-type subsystem is that in which captions are edited for spoken utterances within the video on a groups-of-line basis without respect to particular lines of the captions and without respect to temporal positioning of the captions in relation to the spoken utterances. The line-based subsystem is that in which captions are edited for spoken utterances within the video on a line-by-line basis with respect to particular lines of the captions and with respect to temporal positioning of the captions in relation to the spoken utterances. For each section of spoken utterances within the video, the mechanism is to select the editor-type or the line-based subsystem to provide captions for the section of spoken utterances in accordance with a predetermined criteria.

2 Claims, 6 Drawing Sheets

U.S. PATENT DOCUMENTS

| | | | |
|---|---|---|---|
| 6,580,437 B1* | 6/2003 | Liou et al. | 715/719 |
| 7,013,273 B2* | 3/2006 | Kahn | 704/235 |
| 7,117,231 B2* | 10/2006 | Fischer et al. | 1/1 |
| 7,130,790 B1* | 10/2006 | Flanagan et al. | 704/2 |
| 7,191,117 B2* | 3/2007 | Kirby et al. | 704/9 |
| 7,212,873 B1* | 5/2007 | Townsend et al. | 700/94 |
| 7,729,917 B2* | 6/2010 | Miyamoto et al. | 704/270 |
| 7,739,116 B2* | 6/2010 | Miyamoto et al. | 704/270 |
| 2002/0016712 A1* | 2/2002 | Geurts et al. | 704/275 |
| 2003/0145337 A1* | 7/2003 | Xing | 725/136 |
| 2004/0024601 A1* | 2/2004 | Gopinath et al. | 704/270 |
| 2005/0203750 A1 | 9/2005 | Miyamoto et al. | |
| 2006/0100883 A1 | 5/2006 | Miyamoto et al. | |
| 2007/0011012 A1* | 1/2007 | Yurick et al. | 704/277 |
| 2008/0040111 A1* | 2/2008 | Miyamoto et al. | 704/240 |
| 2008/0270110 A1* | 10/2008 | Yurick et al. | 704/3 |
| 2009/0259473 A1* | 10/2009 | Chang et al. | 704/260 |
| 2010/0332214 A1* | 12/2010 | Shpalter et al. | 704/2 |

OTHER PUBLICATIONS

Piperidis, S., I. Demiros, and P. Prokopidis. 2005. Infrastructure for a multilingual subtitle generation system, 9th International Symposium on Social Communication, Santiago de Cuba, Cuba.*

Ando, S., T. Imai, A. Kobayashi, H. Isono, and K. Nakabayashi. 2000. Real-Time Transcription System for Simultaneous Subtitling of Japanese Broadcast News Programs, IEEE transactions on broadcasting. 46, 3: 189.*

* cited by examiner

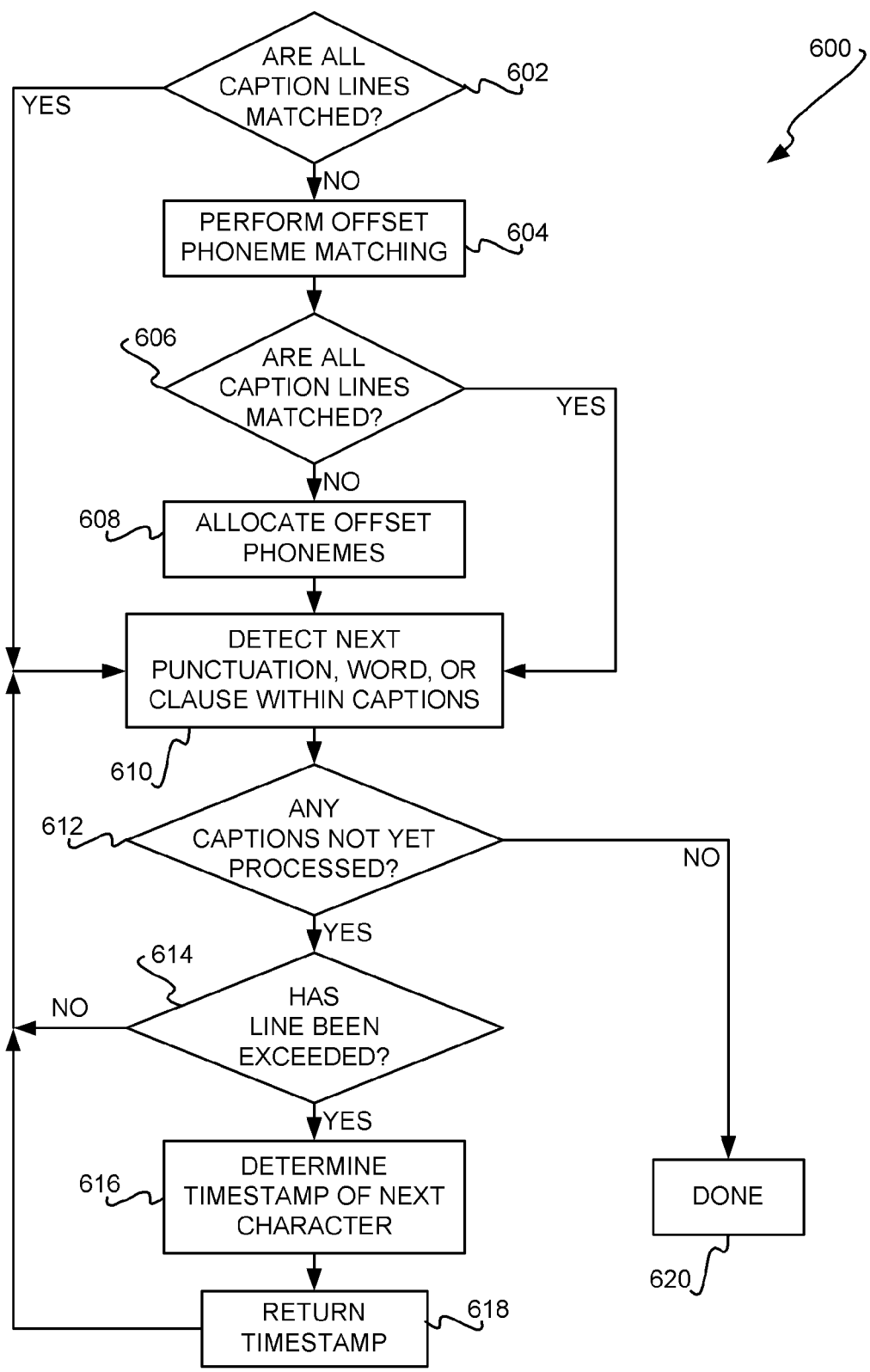

HYBRID-CAPTIONING SYSTEM

RELATED APPLICATIONS

The present patent application is a continuation of the previously filed patent application assigned Ser. No. 11/294,234, and filed on Dec. 4, 2005.

FIELD OF THE INVENTION

The present patent application relates generally to generating captions for spoken utterances within video, and more particularly to a hybrid-captioning system to generate such captions and that employs both editor-type caption-editing and line-based caption-editing.

BACKGROUND OF THE INVENTION

Just as a caption in a book is the text under a picture, captions on video are text located somewhere on the picture. Closed captions are captions that are hidden in the video signal, invisible without a special decoder. The place they are hidden is called line 21 of the vertical blanking interval (VBI). Open captions are captions that have been decoded, so they become an integral part of the television picture, like subtitles in a movie. In other words, open captions cannot be turned off. The term "open captions" is also used to refer to subtitles created with a character generator.

Within the prior art, captions are commonly generated by voice recognition, manual human entry, or a combination of these techniques. Once generated by either approach, the captions have to be edited. In particular, the captions may have to be proofread for correctness, and properly and appropriately keyed to the video itself if not already accomplished by the caption-generation process. For instance, a given caption may have a timestamp, or temporal position, in relation to the video that indicates when the caption is to be displayed on the video. Furthermore, a caption may have a particular location at which to be displayed. For example, if two people on the video are speaking with one another, captions corresponding to spoken utterances of the left-most person may be placed on the left part of the video, and captions corresponding to spoken utterances of the right-most person may be placed on the right part of the video.

Within the prior art, there are three general types of conventional caption-editing systems. First, there is an editor-type caption-editing system, in which captions are edited for spoken utterances within video on a groups-of-line basis, without respect to particular lines of the captions and without respect to temporal positioning of the captions in relation to the spoken utterances. Such a caption-editing system may even include multiple-line editing capabilities within computer programs like word processors. In this type of system, there is no timestamping of the captions to the video, since the captions are generated for the video, or sections of the video, as a whole, without regard to temporal positioning. This type of system is also commonly referred to as "summary writing" or "listening dictation." This type of system is useful where there are many errors in the captions themselves, since editing can be accomplished without regards to the different lines of the captions temporally corresponding to different parts of the video. However, it does require temporal positioning—i.e., timestamping—to later be added, which is undesirable.

Second, there is a line-based caption-editing system, in which captions are generated for spoken utterances within video on a line-by-line basis with respect to particular lines of the captions and with respect to temporal positioning of the captions in relation to the spoken utterances. Line-based caption-editing systems thus operate in relation to timestamps of the captions in relation to the video, on a caption line-by-caption line basis. This type of system is very effective for captions that are generated without errors, especially since temporal positioning—i.e., timestamping—is accomplished as part of the captioning process. However, where there are many errors within the captions, correction can become difficult, since the temporal positioning of the lines may become incorrect as a result of modification of the lines themselves. For instance, lines may be deleted, added, or merged, in the process of editing, which can render the previous temporal positioning—i.e., timestamping—incorrect, which is undesirable as well.

A third type of caption-editing system is a respeaking caption-editing system. In respeaking, a specialist with a proven high voice-recognition rate respeaks the voices of various speakers on video, in order to convert them into voices with a higher voice-recognition rate. This approach is disadvantageous, however, because it is very labor intensive, and requires the utilization of highly skilled labor, in that only people who have proven high voice-recognition rates should respeak the voices of the speakers on the video. Thus, of the three types of caption-editing systems within the prior art, the editor-type system is useful where voice recognition results in many errors, the line-based system is useful where voice recognition results in few errors, and the respeaking system is relatively expensive.

In a given video, however, there may be sections in which voice recognition achieves a high degree of accuracy on the spoken utterances in question, and there may be other sections in which voice recognition does not achieve a high degree of accuracy on the spoken utterances in question. Therefore, using an editor-type caption-editing system achieves good results for the latter sections but not for the former sections. By comparison, using a line-based caption-editing system achieves good results for the former sections but not for the latter sections. Therefore, there is a need for achieving good caption results for all sections of video, regardless of whether the voice recognition yields accurate results or not. For this and other reasons, there is a need for the present invention.

SUMMARY OF THE INVENTION

The present invention relates to a hybrid-captioning system for editing captions for spoken utterances within video. The system in one embodiment includes an editor-type caption-editing subsystem, a line-based caption-editing subsystem, and a mechanism. The editor-type subsystem is that in which captions are edited for spoken utterances within the video on a groups-of-line basis without respect to particular lines of the captions and without respect to temporal positioning of the captions in relation to the spoken utterances. The line-based subsystem is that in which captions are edited for spoken utterances within the video on a line-by-line basis with respect to particular lines of the captions and with respect to temporal positioning of the captions in relation to the spoken utterances. For each section of spoken utterances within the video, the mechanism is to select the editor-type subsystem or the line-based subsystem to provide captions for the section of spoken utterances in accordance with a predetermined criteria.

For instance, this criteria may be the certainty level (i.e., the accuracy) of voice recognition that has been performed as to a given section of the spoken utterances within the video to perform the initial generation of the captions for that section.

Where the certainty level is greater than a predetermined threshold, the mechanism selects the line-based caption-editing subsystem to ultimately provide the captions for this section of spoken utterances. However, where the certainty level is not greater than the predetermined threshold, the mechanism instead selects the editor-type caption-editing subsystem to ultimately provide the captions for this section of spoken utterances.

A method of an embodiment of the invention, in relation to video for which captions are to be generated, receives user input as to a correct section of the video for which captions have been initially generated. The user input is received with an editor-type caption-editing subsystem. Where the user input corresponds to termination of the editor-type caption-editing subsystem—i.e., where the user has terminated editing of these captions within this subsystem—the following is accomplished. First, the captions are transmitted to a general-matching subsystem. The general-matching subsystem transmits the captions to a line-based caption-editing subsystem. If the user input does not correspond to termination of the editor-type caption-editing subsystem, however, then the method transmits the captions to a particular-matching subsystem (i.e., a different matching subsystem), which transmits the captions back to the editor-type subsystem.

An article of manufacture of an embodiment of the invention includes a tangible computer-readable data storage medium, and means in the medium. The means may be a computer program, for instance. The means is for selecting an editor-type caption-editing subsystem or a line-based caption-editing subsystem to provide captions for each of a number of sections of spoken utterances of video, in accordance with a predetermined criteria, such as that which has been described.

Embodiments of the invention provide for advantages over the prior art. Within a given video, there may be sections of spoken utterances for which caption editing is best achieved via editor-type caption editing, and other sections of spoken utterances for which caption editing is best achieved via line-based caption editing. Accordingly, embodiments of the invention provide for a hybrid-captioning system, in which both editor-type caption editing and line-based caption editing are both able to be achieved, depending on the section of spoken utterances of the video in question. By comparison, the prior art always forces a user to choose either line-based caption editing or editor-type caption editing, without letting a user use the former type of editing on captions for some sections of video, and the latter type of editing on captions for other sections of video.

For instance, a section of spoken utterances within the video that has a high certainty level of voice recognition may be edited within a line-based caption-editing subsystem of the inventive hybrid-captioning system, since line-based caption editing is most appropriate for captions having such high degrees of voice recognition accuracy or certainty. As another example, another section of spoken utterances within the video that has a low certainty level of voice recognition may be edited within an editor-type caption-editing subsystem of the inventive hybrid-captioning system, since editor-type caption editing is most appropriate for captions having such low degrees of voice recognition accuracy or certainty. Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 6 is a flowchart of a method for general timestamp matching between captions and spoken utterances within video, according to an embodiment of the invention.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
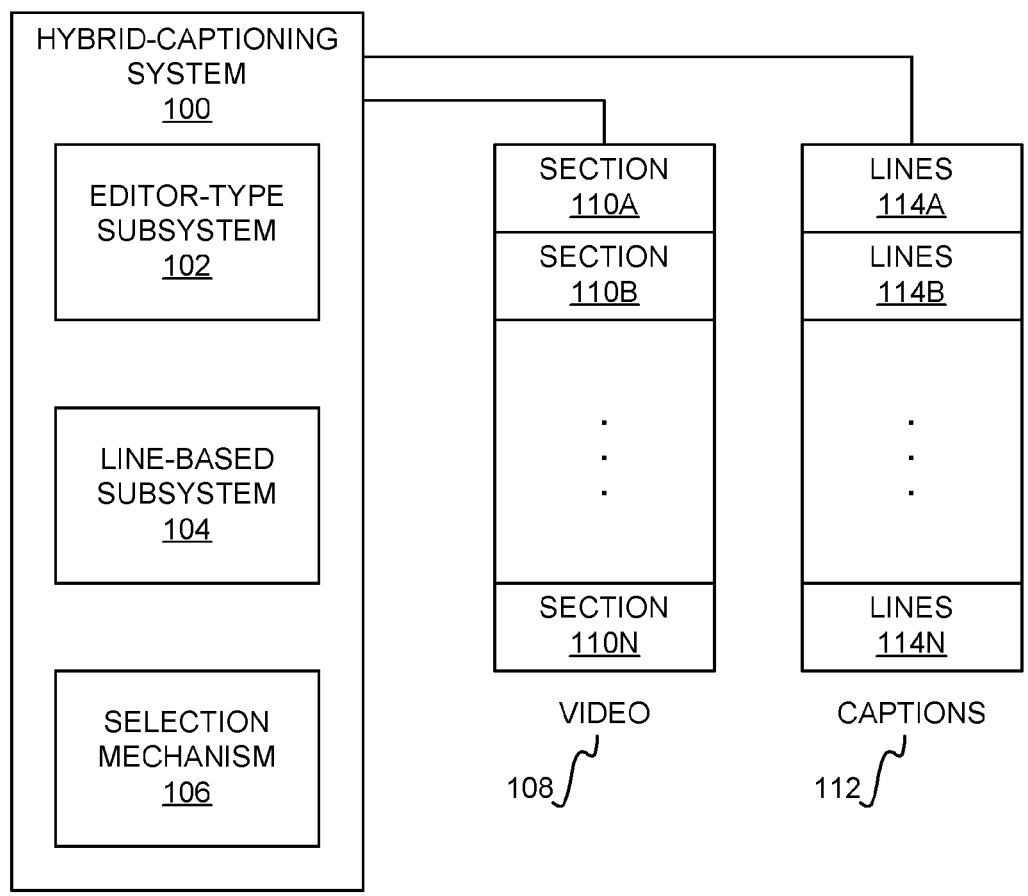
FIG. 1 is a diagram of a hybrid-captioning system, according to a general and preferred embodiment of the invention, and is suggested for printing on the first page of the patent.

FIG. 1 shows a hybrid-captioning system 100, according to an embodiment of the invention. The system 100 is depicted in FIG. 1 as including an editor-type caption-editing subsystem 102, a line-based caption-editing subsystem 104, and a selection mechanism 106. Both the subsystem 102 and the subsystem 104, as well as the mechanism 106, may be implemented in software, hardware, or a combination of software and hardware. As can be appreciated by those of ordinary skill within the art, the system 100 may include other components, in addition to and/or in lieu of those depicted in FIG. 1.

The editor-type caption-editing subsystem 102 may in one embodiment be implemented as is conventional, and in another embodiment may be modified to provide additional functionality as is described later in the detailed description. In general, the editor-type subsystem 102 provides for the editing, including the generation, of captions for spoken utterances within video 108, which includes moving pictures and corresponding sound. This editing is provided for on a groups-of-caption lines basis, without respect or regards to particular lines of the corresponding captions 112, and without respect to temporal positioning of the captions 112 in relation to the spoken utterances within the video 108, as has been described in more detail in the background section.

The line-based caption-editing subsystem 104 may in one embodiment be implemented as is conventional, and in another embodiment may be modified to provide additional functionality as is described later in the detailed description. In general, the line-based subsystem 104 provides for the editing, including the generation, of captions for spoken utterances within the video 108, as with the subsystem 102. This editing, however, is provided for on a line-by-line basis with respect to particular lines of the captions 112 and with respect to temporal positioning, or timestamping, of these captions 112 in relation to the spoken utterances within the video 108, as has been described in more detail in the background section.

The video 108 itself can be considered as having a number of sections 110A, 110B, . . . , 110N, collectively referred to as the sections 110. The captions 112 themselves can be considered as having a number of corresponding groupings of lines 114A, 114B, . . . , 114N, collectively referred to as the lines 114. Thus, for each of the sections 110 of the video 108, a corresponding one or more lines of the lines 114 is initially generated as the captions for the spoken utterances within that section of the video 108. In one embodiment, voice recognition, or a user manually listening to the video 108, is accomplished to generate the lines 114 corresponding to the sections 110.

Thereafter, the mechanism 106 determines which of the subsystems 102 and 104 is to achieve ultimate editing, and thus ultimate generation, of the lines of the captions 112 corresponding to a given section of the video 108, based on or in accordance with a predetermined criteria. For instance, in one embodiment, the voice recognition of one or more portions of a given section of the video 108 is sampled or tested to determine the certainty or accuracy level of that voice recognition. If the certainty or accuracy level of the voice recognition results is relatively high (i.e., above a threshold), then the mechanism 106 selects the line-based subsystem 104 to provide subsequent editing and generation of the corresponding captions. However, if the certainty or accuracy level of the voice recognition results is relatively low (i.e., not above a threshold), then the mechanism 106 selects the editor-type subsystem 102 to provide subsequent editing and generation of the corresponding captions. This selection is achieved for each of the sections 110 of the video 108 for which corresponding of the lines 114 of the captions 112 have been initially generated.

Thus, the mechanism 106 allows for optimal editing and generation of the captions 112 for the video 108, even where some sections of the video 108 are best handled in relation to the editor-type subsystem 102, and other sections of the video 108 are best handled in relation to the line-based subsystem 104. It is noted that the video 108 may be real-time video, or recorded video. Furthermore, the captions 112 may be open captions, or closed captions, as have been defined in the background section. Finally, it is noted that in one embodiment, the captions 112 are generated independent of the input path by which the video 108 is generated and by which voice recognition on the video 108 is achieved. That is, the hybrid-captioning system 100 is independent of any particular type of microphone, for instance, as well as is independent of any particular requirements as to the file locations, and thus file paths, of the video 108 and the captions 112, as can be appreciated by those of ordinary skill within the art.

Figure 2:
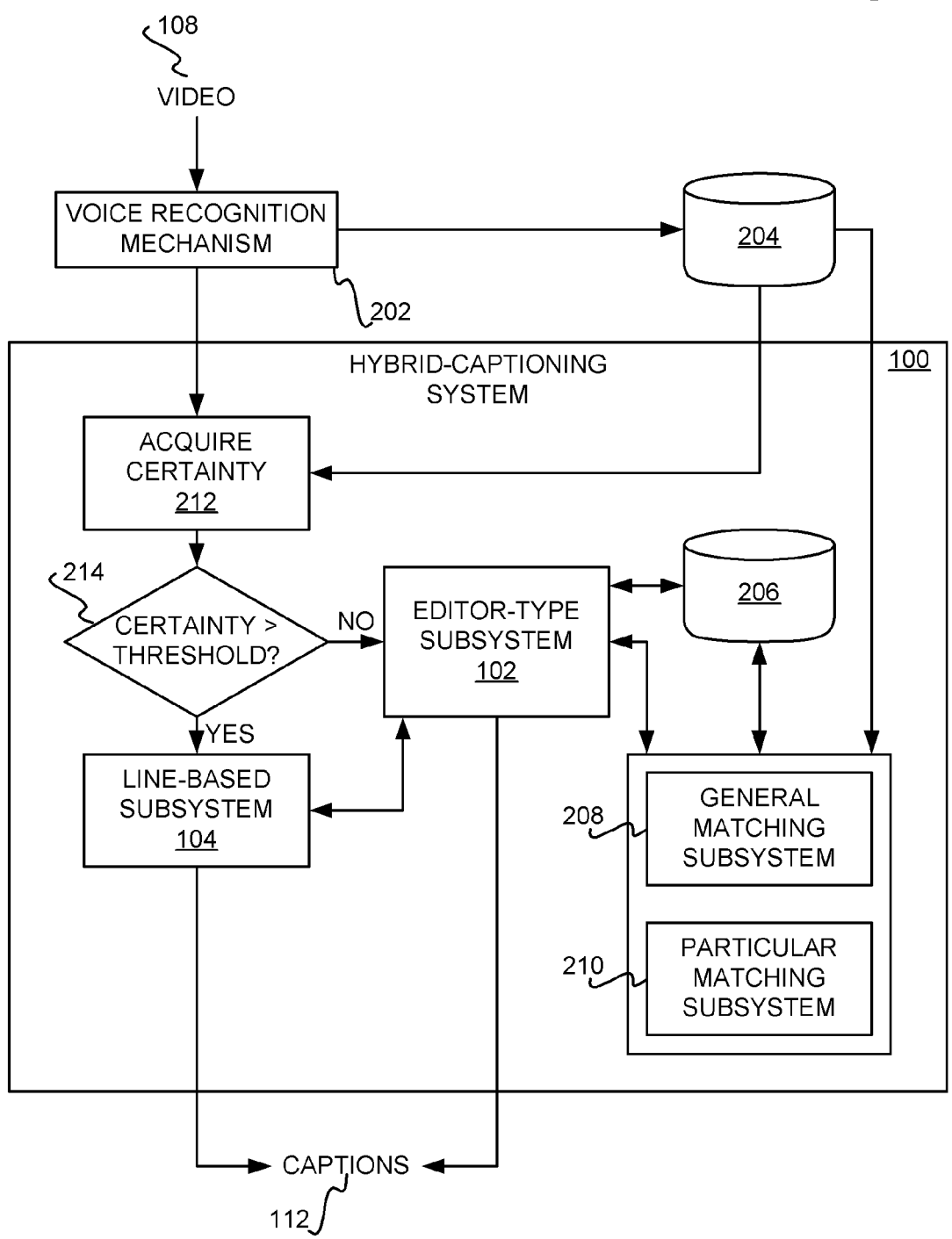
FIG. 2 is a diagram of a hybrid-captioning system, according to a more detailed embodiment of the invention.

FIG. 2 shows the hybrid-captioning system 100 in more detail, according to an embodiment of the invention. The system 100 of the embodiment of FIG. 2 is thus more detailed than but consistent with the system 100 of the embodiment of FIG. 1. The selection mechanism 106 is not depicted in FIG. 2, but rather the functionality that the selection mechanism 106 performs—in parts 212 and 214—is instead depicted in FIG. 2.

The speech utterances of the video 108 are input into a voice-recognition mechanism 202, which may be implemented in hardware, software, or a combination of hardware and software. The voice-recognition mechanism 202 recognizes voice within these speech utterances, either with or without human intervention, and thus generates an initial version of the captions 112 for the video 108. These voice recognition results are stored in a storage device 204. The voice-recognition mechanism 202 may be implemented in one embodiment as is conventional.

Furthermore, any initial timestamping of which voice recognition results (i.e., which of the captions 112) correspond to which parts of the video 108 is stored in the storage device 204 and/or the storage device 206, as well as the individual phonemes of the speech utterances of the video 108 on which basis voice recognition was achieved. A phoneme is the smallest phonetic unit in a language that is capable of conveying a distinction in meaning, as the m of mat and the b of bat in English. Finally, the certainty or accuracy level of the voice recognition results, on a section-by-section basis of the sections 110 of the video 108, is stored in the storage device 204 and/or the storage device 206. This certainty or accuracy level may also be yielded with or without human intervention, as can be appreciated by those of ordinary skill within the art.

The voice-recognition mechanism 202 then passes control to the hybrid-captioning system 100. For each section of the video 108, the selection mechanism 106 acquires the certainty level of the resulting voice recognition results (i.e., the initial version of the captions 112 for this section), in part 212. Where the certainty level is greater than a predetermined threshold, such as 75% out of 100%, then the mechanism 106 provides for ultimate generation and editing of the captions 112 in question by the line-based caption-editing subsystem 104, as indicated in part 214. As also indicated in part 214, where the certain level is not greater than this threshold, then the mechanism 106 provides for ultimate generation and editing of the captions 112 in question by the editor-type subsystem 102.

It is noted that the editor-type subsystem 102 is able to interact with a storage device 206 of the hybrid-captioning system 100, and a general-matching subsystem 208 and a particular-matching subsystem 210 of the hybrid-captioning system 100. The line-based subsystem 104 is also able to interact with the storage device 206 and the subsystems 208 and 210. However, in the embodiment depicted specifically in FIG. 2, this latter interaction is not direct, but rather is indirectly accomplished through the editor-type subsystem 102. In another embodiment, though, the interaction between the line-based subsystem 104 and the storage device 206 and the subsystems 208 and 210 may instead be direct. It is noted that the ultimate output by the editor-type subsystem 102 and the line-based subsystem 104 is the captions 112.

The storage device 206 stores various information, including user inputs to be provided to the subsystems 102 and 104, as well as character strings stored by the subsystems 208 and 210 and provided to the subsystems 102 and 104, as will be described, and also timestamps, which may also be stored by the subsystems 208 and 210 and provided to the subsystems 102 and 104, as will also be described. The subsystems 208 and 210 may each be implemented in hardware, software, or a combination of hardware and software. The general-matching subsystem 208 is specifically that which is used in relation to the line-based subsystem 104, and the particular-matching subsystem 210 is specifically that which is used in relation to the editor-type subsystem 102.

The general-matching subsystem 208 is to match spoken utterances of a given section of the video 108 to the captions 112 that have been generated (i.e., the voice recognition results) for this section, as is described in more detail later in the detailed description. A section of the video 108 in this respect corresponds to one or more individually demarcated lines of the lines 114 of the captions 112. That is, since the subsystem 208 is used for the line-based subsystem 104, which is used where voice-recognition results are relatively high, the individual lines of the captions 112 corresponding to this section of the video 108 thus will have been accurately demarcated.

By comparison, the particular-matching subsystem 210 is to match spoken utterances of a given section of the video 108 to the captions 112 that have been generated (i.e., the voice recognition results) for this section, as is also described in more detail later in the detailed description. However, a section of the video 108 in this respect corresponds to a group of lines of the lines 114 of the captions 112 that are not demarcated. That is, since the subsystem 210 is used for the editor-type subsystem 102, which is used where voice-recognition results are relatively low, the individual lines of the captions 112 corresponding to this section of the video 108 thus will not have been demarcated at all.

For example, the section 110A of the video 108 corresponds to the lines 114A of the captions 112. Now, where the voice-recognition results for this section 110A are relatively high (i.e., relatively accurate, above a threshold, and so on), then the lines 114A will include one or more lines that are individually demarcated in relation to one another. For instance, there may be three lines, which are individually demarcated as different lines. Such individually demarcated lines are most suitable for line-based caption editing, as is performed in the line-based caption-editing subsystem 104, and as has been described in the background section.

However, where the voice-recognition results for this section 110A are relatively low (i.e., relatively inaccurate, below a threshold, and so on), then the lines 114A may still include one or more lines, but they are not individually demarcated in relation to one another, but rather are considered a single grouping of lines. For instance, there may be three separate lines, but for purposes of captioning, these three lines are just considered part of the same grouping. Such a grouping of lines, without individual line demarcation, are most suitable for editor-type caption editing, as is performed in the editor-type caption-editing subsystem 102, and as has been described in the background section.

Figure 3:
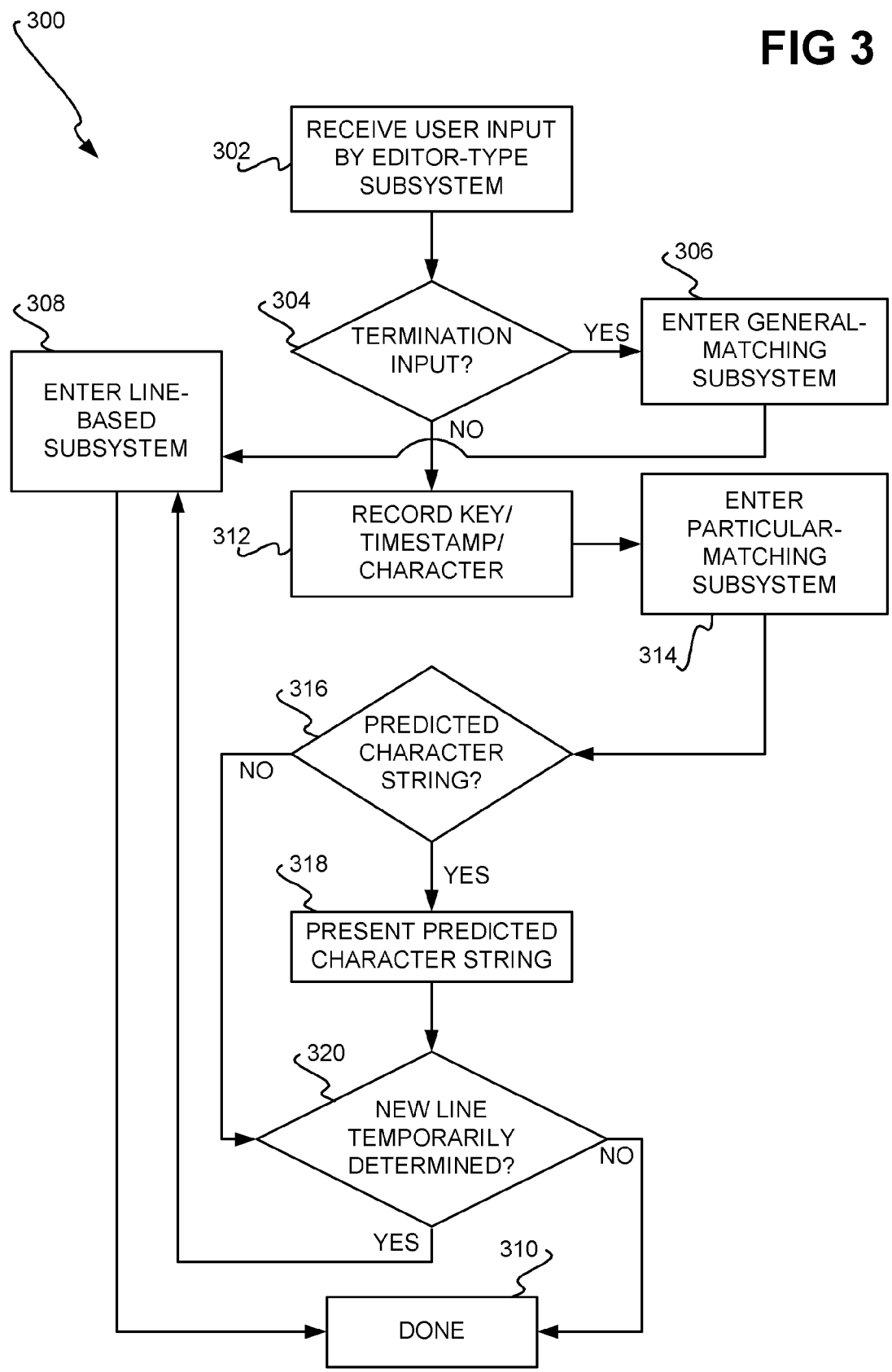
FIG. 3 is a flowchart of a method for hybrid captioning to edit, including to generate, captions for spoken utterances within video, according to an embodiment of the invention.

FIG. 3 shows a method 300 for performing hybrid captioning, according to an embodiment of the invention. The method 300 is performed in relation to the various components of the system 100, such as that which has been described in relation to FIG. 2 and/or FIG. 3. However, the method 300 provides the components of the system 100 with slightly different functionality as compared to that which has been described above. In particular, as will become apparent, the editor-type subsystem 102 has initial and primary processing responsibility, and hands over processing to the other subsystems 104, 208, and 210 as needed. It is also noted that not described in relation to the method 300 (and the other methods subsequently described) is that the various components of the system 100 can employ the information stored in the storage devices 204 and 206 of FIG. 2 as needed and as necessary, such that access to these devices 204 and 206 is not described in relation to the method 300 (and the other methods subsequently described).

First, user input is received by the editor-type subsystem 102 (302). The user input is in relation to a current section of the video 108 for which captions have been initially generated, such as by the voice-recognition mechanism 202 of FIG. 2, for instance. The user may specify via this input that the editor-type subsystem 102 is not to be used to edit or finalize (i.e., ultimately generate) these captions (304), in which case the general-matching subsystem 208 is entered (306), and thereafter the line-based subsystem 104 is entered (308). That is, it can be said that the captions are transmitted to the subsystem 208, and then to the subsystem 104. The functionality performed by the subsystem 208 is as has been described, and as is described in more detail later in the detailed description.

If the user has not entered input specifying that the editor-type subsystem is not to be used (304), then the method 300 proceeds to record one or more keys, timestamps, and/or characters (312). That is, because the editor-type subsystem 102 is providing the finalization of the captions, the user has to enter the manually the keys to which the various lines over which the captions are to be divided, since the captions for this section of the video 108 itself is a group of lines that is not demarcated. Thus, the keys can correspond to the demarcations of the captions into a number of lines. Likewise, the user can enter the timestamps of the video 108 at which these lines correspond, to indicate when these lines are to be displayed. Finally, the user may enter in one or more characters of the lines, or delete or modify characters of the lines of the captions as may be preexisting due to the earlier generation by the voice-recognition mechanism 202.

Thereafter, the particular-matching subsystem 210 is entered (314). That is, the captions for the section of the video 108 in question, as modified by the recorded information in part 312, can be said to be transmitted to the subsystem 210. The functionality performed by the subsystem 210 is as has been described, and as is described in more detail later in the detailed description. Thereafter, the editor-type subsystem 102 is reentered, such that it can be said that the captions for the section of the video 108 in question, as may have been modified by the subsystem 210, are transmitted back to the editor-type subsystem 102.

If the particular-matching subsystem 210 generated any predicted character string as part of the captions (316), then such predicted character strings are presented to the user within the editor-type subsystem 102 (318). In either case, thereafter, if a new line within the captions has been (temporarily) determined by the particular-matching subsystem 210 (320), then the line-based subsystem 104 is entered (308). That is, if the particular-matching subsystem 210 has itself divided the captions into one or more new lines, then it is now appropriate for the line-based subsystem 104 to perform processing. These new lines are temporary lines, since the line-based subsystem 104 may modify them further, as is conventional. In addition, entry of the line-based subsystem 104 is said to be considered transmission of the captions to the subsystem 104.

If there are no new lines of the captions for the section of the video 108 in question temporarily determined by the particular-matching subsystem 210 (320), then the method 300 is finished (310). Likewise, once processing by the line-based subsystem 104 is finished (308), the method 300 is finished (310). Processing by the line-based subsystem 104 may be accomplished as is conventional, as can be appreciated by those of ordinary skill within the art, where a summary of such functionality has been described earlier in the detailed description and in the background. It is noted that the method 300 may be repeated for each section of the video 108, until all the sections of the video 108 have been processed insofar as captioning is concerned.

Figure 4:
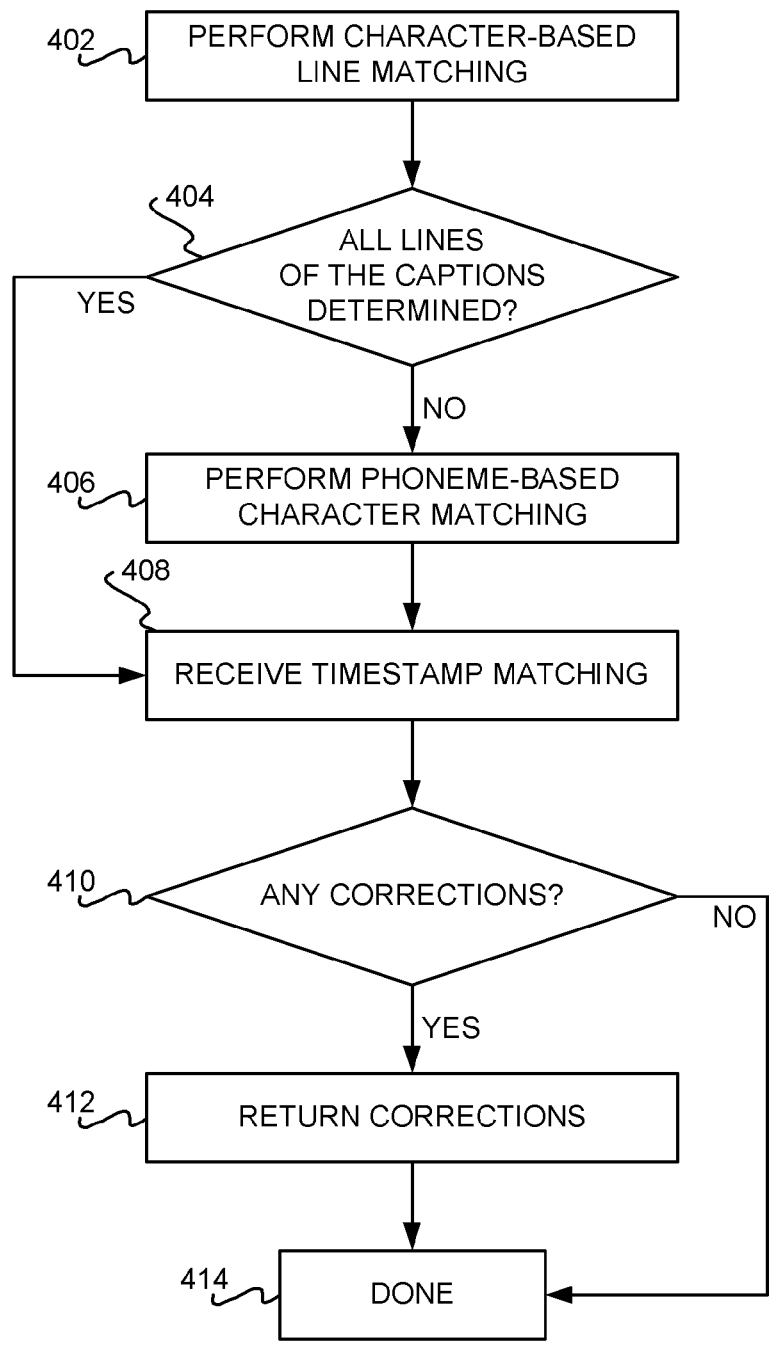
FIG. 4 is a flowchart of a method for caption-video matching prior to and/or in accordance with line-based caption editing, according to an embodiment of the invention.

FIG. 4 shows a method 400 that can be performed by the general-matching subsystem 208 of FIG. 2 when it is entered to perform functionality on the captions for a given section of the video 108, according to an embodiment of the invention. First, character-based line matching is performed (402). Matching in this respect means matching the captions with the video 108, so that the captions can be correctly aligned with the video 108, such that when the video 108 is played back, the captions are displayed at the correct time. Character-based line matching means that lines of the captions are matched to spoken utterances within the video 108 based on the characters of the lines themselves.

The manner by which matching in general is performed is not limited by embodiments of the invention. Any particular approach or technique that yields satisfactory results can be used, for instance. In one embodiment, dynamic programming (DP) models and techniques can be employed, as understood by those of ordinary skill within the art. DP refers to a collection of algorithms that can be used to compute optimal policies given a perfect model of the environment, such as a Markov decision process (MDP). Classical DP algorithms are of limited utility in reinforcement learning both because of their assumption of a perfect model and because of their great computational expense, but they are still very important theoretically. Thus, modified DP algorithms can instead be employed which do not require the assumptions and rigor of classical DP algorithms.

If all the captions are not successfully matched via character-based line matching (404), then phoneme-based character matching is performed on the remaining captions (406). Phoneme-based character matches use phonemes in addition to the individual characters. A DP approach may also be used with phoneme-based character matching. Again, matching in this respect means matching the portion of the video 108 to which the captions in question correspond, so that the captions are properly displayed on the video 108 as the video 108 is played back.

Next, a previously determined timestamp matching is received (408). This timestamp matching is a previously determined temporal positioning of the captions in relation to the spoken utterances of the current section of the video 108. This timestamp matching may have been accomplished by the voice-recognition mechanism 202, and stored in the storage device 204, such that it can be said that the general matching subsystem 208 retrieves this matching from the storage device 204. It is noted that the general matching subsystem 208 is entered before the line-based subsystem 104 is entered, such that it can be presumed that such timestamping has been previously performed, or otherwise the particular matching subsystem 210 and the editor-type subsystem 102 would have been entered to process the captions in question.

Because the timestamping achieved by the voice-recognition mechanism 202, for instance, may vary from the matching that has been achieved on the basis of characters and/or phonemes, there may be discrepancies between the two that need rectification. If there are any so-called corrections to be made to the timestamp matching (410)—where the corrections result from the character-based or phoneme-based matching—then these corrections are returned (412) for later rectification by, for instance, the line-based subsystem 104. Ultimately, then, the method 400 is finished (414).

Figure 5:
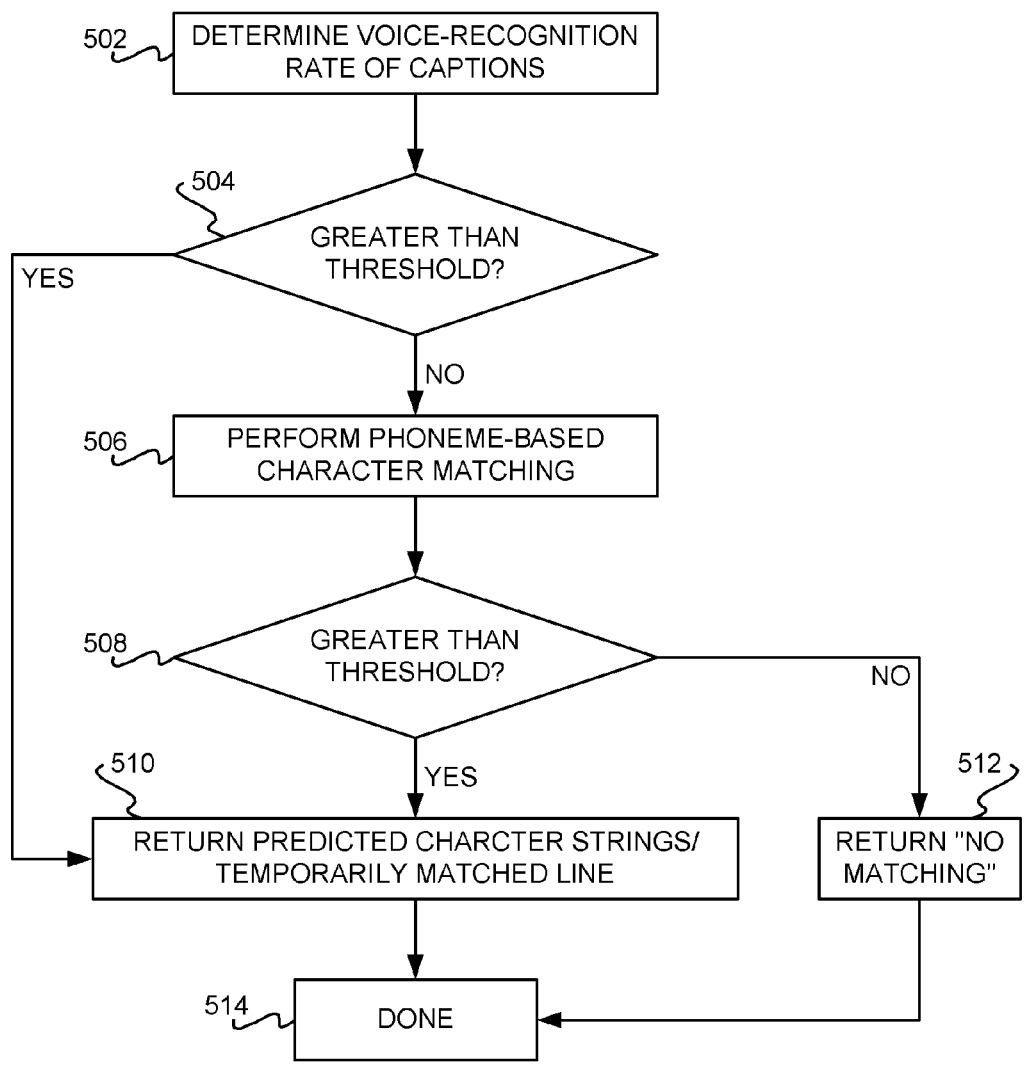
FIG. 5 is a flowchart of a method for caption-video matching prior to and/or in accordance with editor-type caption editing, according to an embodiment of the invention.

FIG. 5 shows a method 500 that can be performed by the particular-matching subsystem 210 of FIG. 2 when it is entered to perform functionality on the captions for a given section of the video 108, according to an embodiment of the invention. First, the voice-recognition rate of the captions initially generated, such as by the voice-recognition mechanism 202 of FIG. 2, is determined (502). Such determination may be accomplished by looking up this rate within a storage device, like the storage device 204 of FIG. 2. Alternatively, a user may be presented with a sample of the captions, and asked to listen to the original video 108 to determine its accuracy.

If this rate is not greater than a predetermined threshold, such as 75% accuracy (504), then the following is performed to in effect redo the caption line matching that was achieved via the initial voice recognition. In particular, phoneme-based character matching is performed (506), where such phoneme-based character matching may be accomplished via a DP algorithm, as has been described. If the resulting of such matching is an accuracy rate that is still not greater than the predetermined threshold, such as 75% accuracy (508), then the method 500 returns that a "no matching" error (512), and is finished (514). That is, if phoneme-based character matching still cannot improve the accuracy or certainty rate greater than the threshold, then an indication is returned that matching captions to the video 108 was not able to be achieved. As before, a user may be requested to verify that phoneme-based character matching was accurate to determine this accuracy rate of such matching, or another approach may be employed.

However, if the initial voice recognition yielded matching greater than the threshold in part 504, or the resultingly performed phoneme-based character matching yielded accuracy greater than the threshold in part 508, then the predicted character strings of such captions for the section of the video 108 in question are returned (510), and the method 500 is finished (514). Such returning of the predicted character strings are thus for later transmission to, for instance, the editor-type subsystem 102 in one embodiment. The character strings may also be referred to as one or more temporarily matched lines. That is, the character strings represent the matching of the captions to the section of the video 108 in question, with respect to temporal positioning or timestamping thereof.

Finally, FIG. 6 shows a method 600 for performing general timestamping, according to an embodiment of the invention. The timestamping achieved by the method 600 is essentially conventional timestamping, but is described herein for completeness. The timestamping of the method 600 may be that which is ultimately received by the method 400 in part 408 of FIG. 4, for instance.

First, the method 600 determines whether all the caption lines of the captions initially determined or generated for the current section of the video 108 in question have been matched to the video 108 (602). Where this is the case, the method 600 proceeds to part 610, as will be described. Where this is not the case, however, offset phoneme matching is performed (604) to attempt to yield such matching. Offset phoneme matching is a particular type of phoneme matching, as understood by those of ordinary skill within the art, and may be performed by utilizing a DP algorithm, as has been described. If offset phoneme matching yields matching of all the caption lines to the video 108 (606), then the method 600 proceeds to part 610, as will be described. Otherwise, offset phonemes are allocated to achieve a rudimentary matching of the captions to the video 108 (608), as understood by those of ordinary skill within the art.

Therefore, ultimately in some manner all the captions for the current section of the video 108 in question have been matched to the video 108, in that they have been temporally synchronized with the video 108. As a result, the next step is to actually generate the timestamps corresponding to these temporal synchronizations. This process starts with the beginning of the captions for the current section of the video 108 in question. In particular, the next punctuation, word, or clause within the captions is detected, or advanced to (610), where in this particular instance this is the first punctuation, word, or clause.

If all the captions have been processed as a result of such detection or advancing (612), then ultimately the method 600 is finished (620). However, where there is still a portion of the captions that have not yet been so processed, then the method 600 continues by determining whether a line has been exceeded or divided (614). That is, if detection of the next punctuation, word, or clause results in advancement from one line to another line, then the test in part 614 is true. For instance, one line may be "THE CAT JUMPED" and the next line may be "OVER THE BAG." When proceeding from the word "JUMPED" to the word "OVER," such that the word that was most recently detected or advanced to in part 610 is the word "OVER," the former line is advanced from and the latter line is advanced to, such that the test in part 614 is true.

In this case, the timestamp of the very next character within the captions for the section of the video 108 in question is determined (616) and returned (618) as corresponding to the line that has been advanced to. For instance, in the example of the previous paragraph, the timestamp of the space character following the word "OVER" is returned as the timestamp corresponding to the line "OVER THE BAG." Following part 618, or where the test of part 614 is false or negative, the method 600 is repeated starting at part 610.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method performed by a hybrid-captioning system to edit captions for spoken utterances within video, the method comprising:
    editing, in an editor-type caption-editing subsystem of the hybrid-captioning system, captions for spoken utterances within the video on a groups-of-lines basis without respect to particular lines of the captions and without respect to temporal positioning of the captions in relation to the spoken utterances;
    editing, in a line-based caption-editing subsystem of the hybrid-captioning system, the captions for spoken utterances within the video on a line-by-line basis with respect to particular lines of the captions and with respect to temporal positioning of the captions in relation to the spoken utterances;
    for each section of spoken utterances within the video, selecting, by a mechanism of the hybrid-captioning system, the editor-type caption-editing subsystem or the line-based caption-editing subsystem to provide the captions for the section of spoken utterances in accordance with a predetermined criteria,
    wherein the mechanism, for each section of spoken utterances within the video, selects the editor-type caption-editing subsystem or the line-based caption-editing subsystem to provide the captions for the section of spoken utterances based on a certainty level of voice recognition as to the section of spoken utterances,
    wherein, for each section of spoken utterances within the video, where the certainty level of voice recognition as to the section of spoken utterances is greater than a predetermined threshold, the mechanism selects the line-based caption-editing subsystem to provide the captions for the section of spoken utterances, and otherwise selects the editor-type caption-editing subsystem to provide the captions for the section of spoken utterances,
    and wherein generation of the captions is independent of an input path selected from the group of input paths essentially consisting of: a microphone path, and a file path.

2. A non-transitory computer-readable storage medium storing a computer program that upon execution by a processor implements a hybrid-captioning system to edit captions for spoken utterances within video and causes the hybrid-captioning system to perform a method comprising:
    editing, in an editor-type caption-editing subsystem of the hybrid-captioning system, captions for spoken utterances within the video on a groups-of-lines basis without respect to particular lines of the captions and without respect to temporal positioning of the captions in relation to the spoken utterances;
    editing, in a line-based caption-editing subsystem of the hybrid-captioning system, the captions for spoken utterances within the video on a line-by-line basis with respect to particular lines of the captions and with respect to temporal positioning of the captions in relation to the spoken utterances;
    for each section of spoken utterances within the video, selecting, by a mechanism of the hybrid-captioning system, the editor-type caption-editing subsystem or the line-based caption-editing subsystem to provide the captions for the section of spoken utterances in accordance with a predetermined criteria,
    wherein the mechanism, for each section of spoken utterances within the video, selects the editor-type caption-editing subsystem or the line-based caption-editing subsystem to provide the captions for the section of spoken utterances based on a certainty level of voice recognition as to the section of spoken utterances,
    wherein, for each section of spoken utterances within the video, where the certainty level of voice recognition as to the section of spoken utterances is greater than a predetermined threshold, the mechanism selects the line-based caption-editing subsystem to provide the captions for the section of spoken utterances, and otherwise selects the editor-type caption-editing subsystem to provide the captions for the section of spoken utterances,
    and wherein generation of the captions is independent of an input path selected from the group of input paths essentially consisting of: a microphone path, and a file path.

* * * * *